United States Patent
Allison et al.

(10) Patent No.: US 12,492,727 B2
(45) Date of Patent: Dec. 9, 2025

(54) LOW WEAR TOROID SEPARATOR FOR BALL BEARINGS

(71) Applicant: AKTIEBOLAGET SKF, Gothenburg (SE)

(72) Inventors: Bryan D. Allison, Clymer, NY (US); Francois Niarfeix, Bloomfield Hills, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 37 days.

(21) Appl. No.: 18/401,814

(22) Filed: Jan. 2, 2024

(65) Prior Publication Data

US 2025/0215929 A1  Jul. 3, 2025

(51) Int. Cl.
*F16C 33/37* (2006.01)
(52) U.S. Cl.
CPC ................ *F16C 33/3706* (2013.01)
(58) Field of Classification Search
CPC .. F16C 33/37; F16C 33/3706; F16C 33/3818; F16C 33/3887; F16C 33/418; F16C 33/51; F16C 33/513
See application file for complete search history.

(56) References Cited

U.S. PATENT DOCUMENTS

| | | | | |
|---|---|---|---|---|
| 1,143,590 | A | * 6/1915 | Shimer | F16C 33/605 384/564 |
| 4,225,199 | A | * 9/1980 | Earsley | F16C 33/6614 384/470 |
| 4,277,117 | A | 7/1981 | George | |
| 8,167,501 | B2 | 5/2012 | Perkinson et al. | |
| 2005/0175264 | A1 * | 8/2005 | Kim | F16C 33/3818 384/51 |
| 2011/0311175 | A1 | 12/2011 | Damato et al. | |

(Continued)

FOREIGN PATENT DOCUMENTS

| | | |
|---|---|---|
| EP | 0164968 A1 | 12/1985 |
| FR | 362421 A * | 4/1906 |

(Continued)

OTHER PUBLICATIONS

Unpublished U.S. Appl. No. 18/457,473, Bryan D. Allison, filed Aug. 29, 2023.

*Primary Examiner* — James Pilkington
(74) *Attorney, Agent, or Firm* — J-TEK LAW PLLC; Scott T. Wakeman; Mark A. Ussai

(57) ABSTRACT

A separator for a ball bearing includes an annular body having a centerline, opposing first and second axial ends and an inner circumferential surface defining a central pocket sized to receive one of the plurality of balls. Preferably, the annular body has a concave outer circumferential surface defining an annular channel and configured to contact at least one adjacent one of the balls along a curved line extending at least partially between the first and second axial ends or at a plurality of contact sections spaced axially apart. The outer circumferential surface has a radius of curvature about equal to a radius of curvature of an outer surface of each one of the balls. Further, the annular body preferably also includes a plurality of annular grooves spaced axially apart, each annular groove extending radially inwardly from the concave outer circumferential surface and circumferentially about the centerline.

17 Claims, 5 Drawing Sheets

(56) References Cited

U.S. PATENT DOCUMENTS

2016/0017918 A1* 1/2016 Corley ................ F16C 33/3706
384/522
2017/0211629 A1 7/2017 An et al.

FOREIGN PATENT DOCUMENTS

JP S4941230 B1 * 11/1974
JP 2008256086 A * 10/2008 ............ F16C 19/163

* cited by examiner

LOW WEAR TOROID SEPARATOR FOR BALL BEARINGS

BACKGROUND OF THE INVENTION

The present invention relates to bearings, and more particularly to separators for ball bearings.

Cages for ball bearings are well known and typically include an annular body with a plurality of circumferentially-spaced pockets, each pocket receiving a separate one of the balls of the bearing. The cage establishes a desired spacing between adjacent balls and guides them as they traverse a pitch circle defined between the bearing inner and outer rings. In certain applications, separators are used instead of cages and typically include an annular body with a single pocket that fits about an individual ball. Generally, a plurality of the separators are installed about half of the balls in a set of balls, with every other ball merely contacting two adjacent separators, such that the separators establish a desired spacing between the balls.

Typically, such separators have an outer circumferential surface that is either cylindrical or partially spherical. As a result, the "loose" balls disposed between each pair of adjacent separators tend to contact the outer surface of each separator at a specific point, which focuses the contact pressure and loading applied to the separator and may eventually lead to failure of the separator. Also, as an insufficient amount of lubricant is often supplied to bearings by the end users thereof, in order to avoid contamination from lubricant escaping the bearing, separators may also fail for lack of adequate lubrication.

SUMMARY OF THE INVENTION

In one aspect, the present invention is a separator for a ball bearing, the ball bearing including inner and outer rings and a plurality of balls disposed between the inner and outer rings. The separator comprises an annular body having a centerline, opposing first and second axial ends, an inner circumferential surface defining a central pocket sized to receive one of the plurality of balls, and a concave outer circumferential surface. The concave outer circumferential surface defines an annular channel and is configured to contact at least one adjacent one of the balls at a plurality of contact sections spaced axially apart between the axial ends or along a curved line extending at least partially between the first and second axial ends.

In another aspect, the present invention is again a separator for a ball bearing, the ball bearing including inner and outer rings and a plurality of balls disposed between the inner and outer rings. The separator comprises an annular body having a centerline, opposing first and second axial ends, an inner circumferential surface defining a central pocket sized to receive one of the plurality of balls and an outer circumferential surface. A plurality of axially-spaced annular grooves extend radially inwardly from the outer circumferential surface and circumferentially about the centerline, each groove being configured to contain lubricant.

In a further aspect, the present invention is a bearing assembly comprising an inner ring having a centerline, an outer ring disposed about the inner ring, a number N of balls disposed between the inner and outer rings and spaced circumferentially about the centerline so as to define a pitch circle and a number X of separators, the number X being equal to one half a value of N. Each separator includes an annular body having a centerline, opposing first and second axial ends, an inner circumferential surface defining a central pocket sized to receive one of the plurality of balls, and an outer circumferential surface. The outer circumferential surface is concave, defines an annular channel and is configured to contact at least one adjacent one of the balls at a plurality of contact sections spaced axially apart or along a curved line extending at least partially between the first and second axial ends and/or a plurality of axially-spaced annular grooves extend radially inwardly from the outer circumferential surface and circumferentially about the centerline, each groove being configured to contain lubricant.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
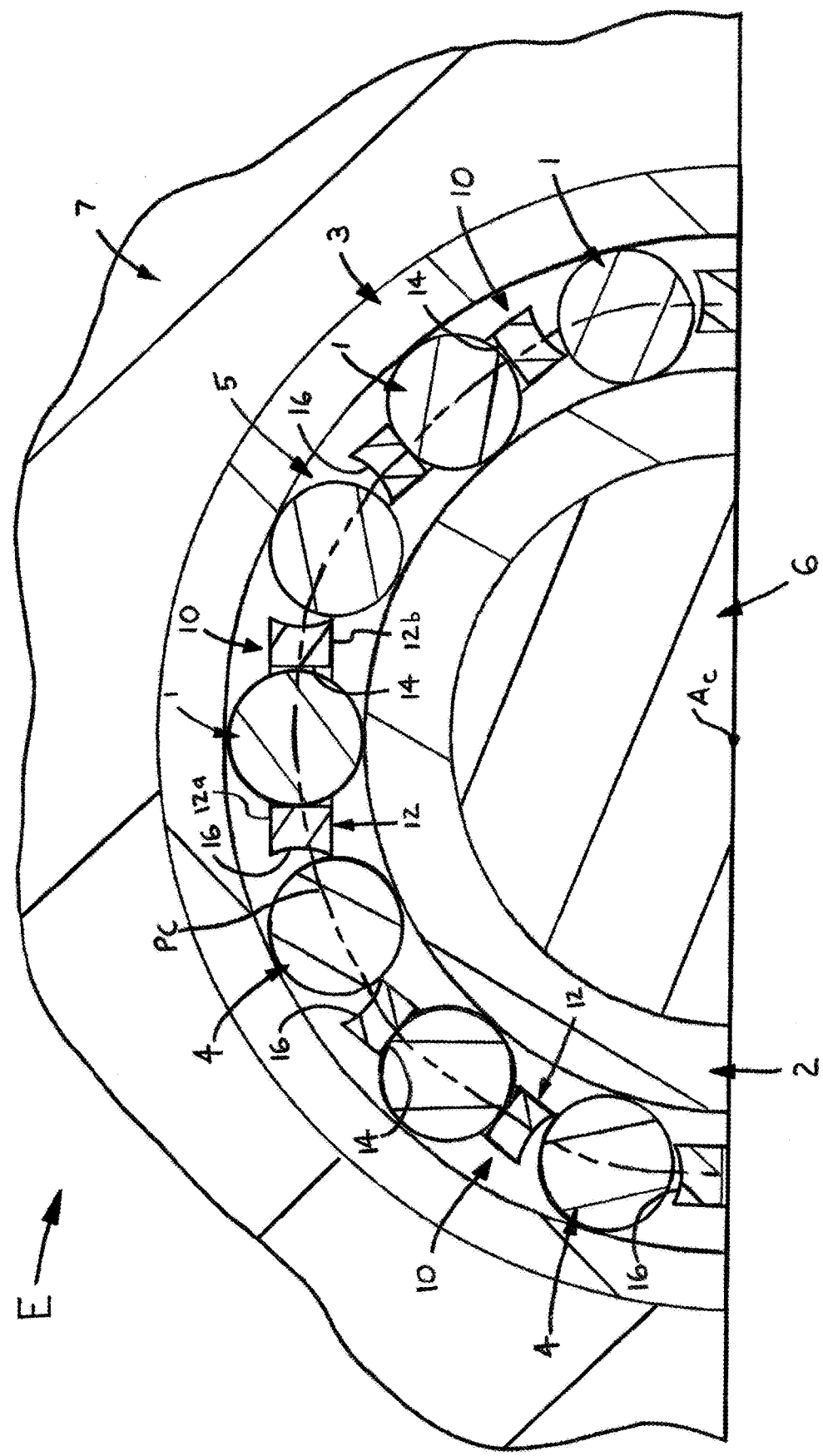
FIG. 1 is a radial cross-sectional view through a bearing including a plurality of separators of the present invention, the bearing coupling a shaft with an outer member of a machine.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a toroid separator 10 for a ball bearing 1, the bearing 1 including an inner ring 2 having an inner race $R_I$, an outer ring 3 having an outer race $R_O$ and a plurality of the balls 4 disposed between the inner and outer rings 2, 3 and forming a ballset 5. The ball bearing 1 functions to rotatably couple an inner member 6, such as a shaft, with an outer member 7, for example a housing or hub, so that one member 6 or 7 rotates about a central axis Ac as the balls 4 traverse a pitch circle PC (FIG. 1) defined between the rings 2, 3. Preferably, the inner and outer members 6, 7 are components or structural members of a machine or item of equipment E used in any appropriate application. Further, the bearing 1 preferably includes a number N of the balls 4 spaced circumferentially about the central axis Ac so as to define the pitch circle PC, and a number X of separators 10, the number X being equal to one half a value of N and the separators 10 being disposed about every other ball 4 in the ballset 5. For example, when the ballset 5 includes twenty balls 4, the bearing 1 includes ten separators 10.

The separator 10 basically comprises an annular body 12 or "toroid" having a centerline $L_C$, opposing first and second axial ends 12a, 12b spaced axially along the centerline $L_C$, an inner circumferential surface 14 and an outer circumferential surface 16. The annular body 12 is diametrically sized to establish a spacing distance between adjacent balls 4, as discussed in further detail below. Preferably, the annular body 12 is formed of a molded polymeric material, most preferably including polyetheretherketone ("PEEK") and reinforcing fibers (e.g., glass fibers), but may be formed of any other appropriate materials.

Further, the inner circumferential surface 14 defines a central pocket 18 sized to receive one of the plurality of balls 4 and is preferably cylindrical. However, the inner surface 14 may alternatively be generally concave and extend radially outwardly into the body 12, so as to generally match the profile of the balls 4, or have any other appropriate shape or contour. Furthermore, the first axial end 12a of the annular body 12 is configured to be slidably disposed upon an outer circumferential surface 2a of the bearing inner ring 2 and/or the second end axial end 12b of the annular body 12 is configured to be slidably disposed against an inner circumferential surface 3a of the bearing outer ring 3. Such contact with the surfaces 2a, 3a of the rings 2, 3 retains each separator 10 disposed centrally about the particular ball 4 disposed within the pocket 18.

Figure 2:
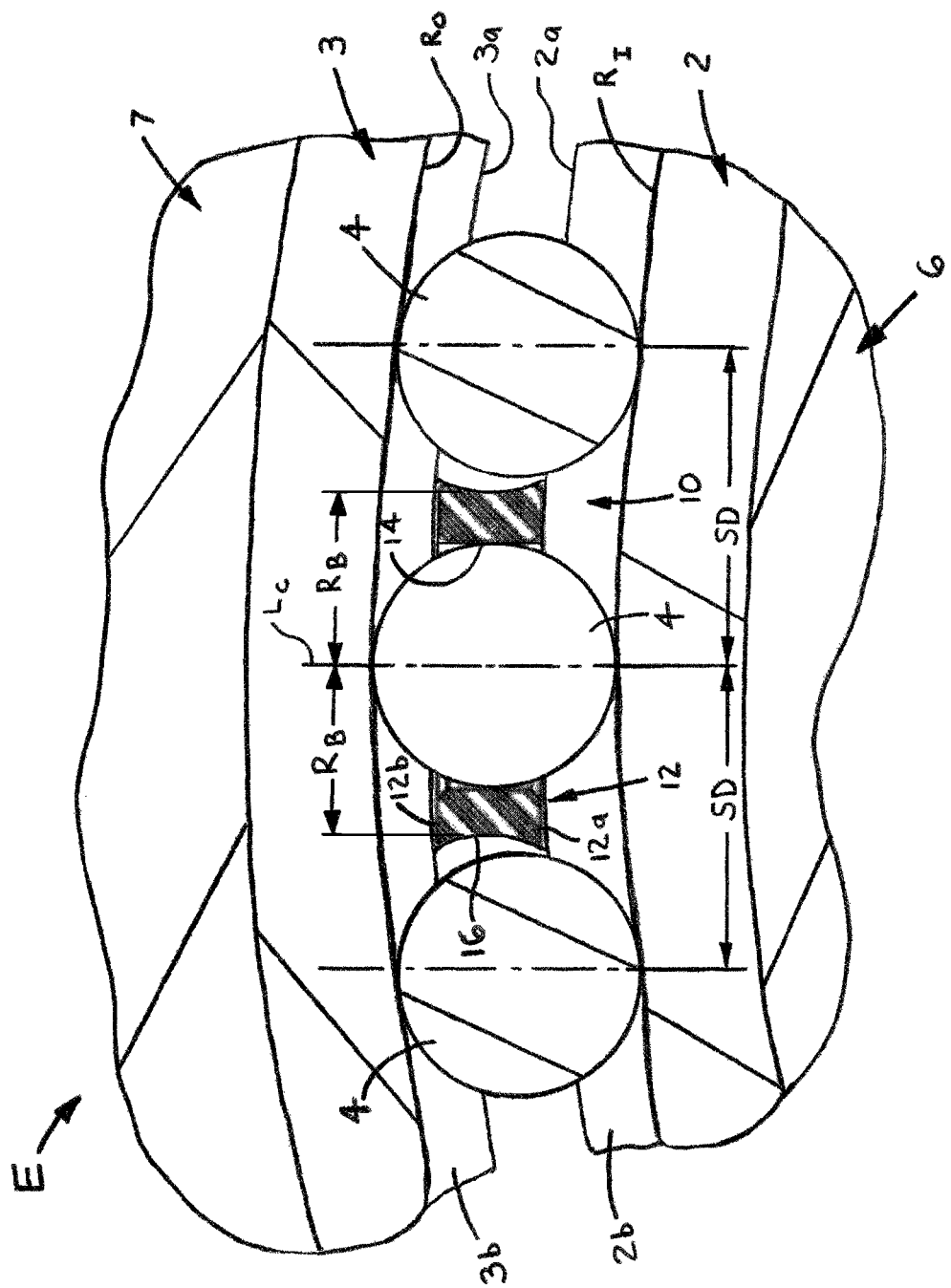
FIG. 2 is an enlarged view of a portion of FIG. 1.
Figure 3:
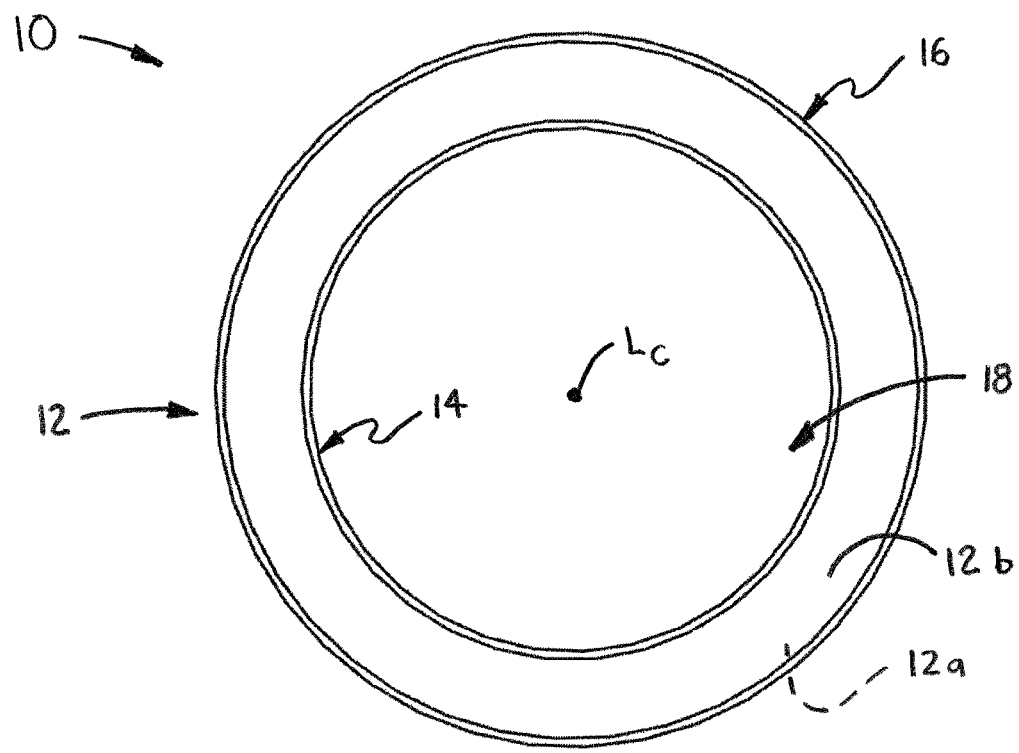
FIG. 3 is a top plan view of a separator formed in accordance with a first construction of the present invention.
Figure 4:
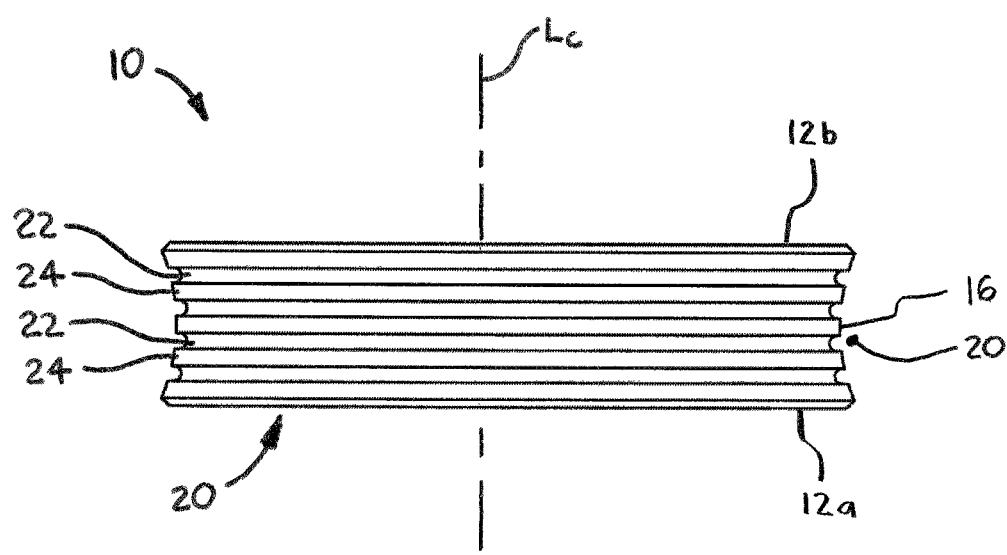
FIG. 4 is a side plan view of the first construction separator.

More specifically, the first axial end 12a provides an inner retention surface configured to be slidably disposed upon at least one inner guide surface 2a of the bearing inner ring 2 and the second axial end 12b provides an outer retention surface configured to be slidably disposed against at least one outer guide surface 3a of the bearing outer ring 3. Such guide surfaces 2a, 3a are typically provided by a pair of annular shoulders 2b, 3b adjacent to the inner race $R_I$ and the outer ring race $R_O$, respectively, as indicated in FIG. 2. In a typical application in which the axial ends of the bearing rings 2, 3 lie within vertical planes, the first axial end 12a slides against the outer guide surface 2a of the inner ring 2 when a separator 10 is located within upper quadrants of the bearing 1 and the second axial end 12b slides against the inner guide surface 3a of the outer ring 3 when the separator 10 is disposed within lower quadrants of the bearing 1. In any case, due to the guide surfaces 2a, 3a supporting either and preferably both of the inner and outer axial ends 12a, 12b, the separator 10 is maintained located centrally about the particular ball 4 disposed within the pocket 18 as the ball 4 traverses the pitch circle PC.

Figure 5:
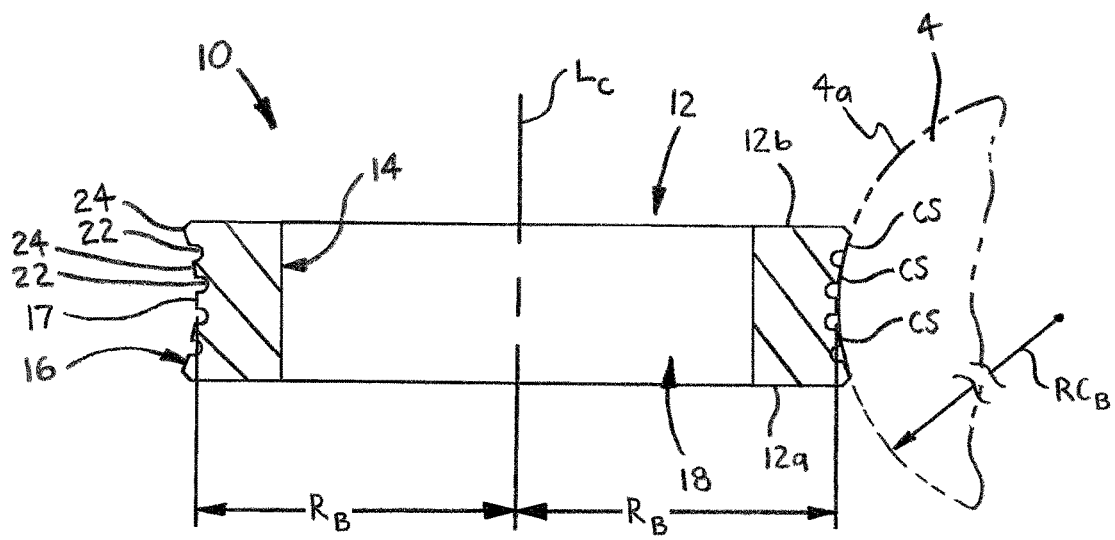
FIG. 5 is a cross-sectional view through the separator of FIG. 4.

Referring to FIGS. 4-7, the outer circumferential surface 16 is preferably concave and extends radially inwardly into the annular body 12. The concave outer circumferential surface 16 defines an annular channel 20 extending circumferentially about the centerline $L_C$. As shown in FIG. 5, the annular body 12 has a radius $R_B$ extending from the centerline $L_C$ to a radially-innermost surface section 17 of the concave outer circumferential surface 16, the radius $R_B$ establishing a minimum spacing distance SD (FIG. 2) between the ball 4 disposed within the central pocket 18 and each one of the adjacent balls 4. Furthermore, with such a concave contour, the outer circumferential surface 16 is configured to contact at least one adjacent one of the balls 4 preferably at a plurality of contact sections CS (FIG. 4) spaced axially apart between the axial ends 12a, 12b or alternatively along a curved line CL (FIG. 7) extending at least partially between the first and second axial ends 12a, 12b.

More specifically, the concave outer circumferential surface 16 has a radius of curvature $RC_S$ (FIG. 6) about equal to a radius of curvature $RC_B$ (FIG. 5) of an outer surface 4a of each one of the balls 4, which is equal to one-half the diameter (not indicated) of each ball 4. As used herein, "about equal" means a surface radius of curvature $RC_B$ that is either exactly equal to the ball radius of curvature $RC_B$ or having a value that is no more than three percent greater than the value of the ball radius of curvature $RC_B$. Due to this configuration, an adjacent ball 4 may contact the concave outer circumferential surface 16 along a curved line CL which extends at least partially, and preferably almost entirely, between the axial ends 12a, 12b of the annular body 12.

Figure 6:
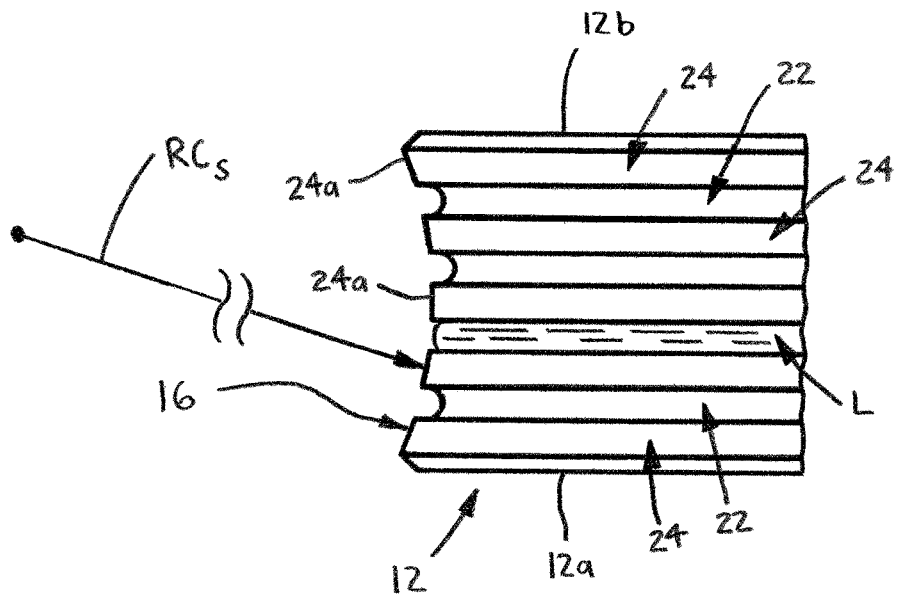
FIG. 6 is a broken-away, enlarged view of a portion of FIG. 4.

However, the annular body 12 preferably further includes a plurality of annular grooves 22 spaced axially apart, each annular groove 22 extending radially inwardly from the concave outer circumferential surface 16 and circumferentially about the centerline $L_C$. Preferably, each groove 22 extends entirely about the body centerline $L_C$, so as to be continuous, but may alternatively be non-continuous and arcuate, and be either axially aligned or axially staggered. In any case, with the grooves 22, the annular body 12 thereby also includes a plurality of annular ribs 24 spaced axially apart, each groove 22 being defined between a separate pair of adjacent ribs 24. As best shown in FIG. 6, each one of the plurality of axial ribs 24 has an outer circumferential surface 24a that is concave, the surfaces 24a collectively defining or providing the outer circumferential surface 16.

Referring particularly to FIG. 5, each annular rib 24 provides a separate one of the axially spaced contact sections CS as described above. As such, when the annular body 12 includes the grooves 22, contact with each adjacent ball 4 is along one or more discrete contact sections CS as opposed to being along a curved line CL. Also, due to the preferred concave outer surfaces 24a of the ribs 24, each contact section CS is formed as an arcuate line segment, but may alternatively be formed as a separate point (not shown), for example when the rib outer surfaces 24a are convex or partially spherical (not shown).

Further, each one of the plurality of annular grooves 22 is configured to contain lubricant, such as grease, heavy oil, etc., and as such, the separator 10 preferably further comprises a quantity of lubricant L disposed within at least one of, and preferably all of, the annular grooves 22, such lubricant L being shown contained within a single groove 22 in FIG. 6. By providing lubricant L within the grooves 22, lubricant is transferred to each adjacent ball 4 during normal operation of the ball bearing 1.

More specifically, due to circumferential clearance between each "loose" ball 4, i.e., a ball 4 not disposed within the pocket 18 of a separator 10, and each adjacent separator 10, the loose balls 4 alternatively contact both adjacent separators 10 during rotation of the ballset 5. That is, although the entire ballset 5 rolls about the bearing pitch circle PC in a single angular direction, the circumferential clearance results in the loose balls 4 intermittently contacting both adjacent separators 10, creating a "pumping" effect that tends to distribute lubricant from the separator grooves 22 to the loose balls 4, and thereafter to the raceways $R_I$, $R_O$, and to the balls 4 contained within the separator pockets 18.

Figure 7:
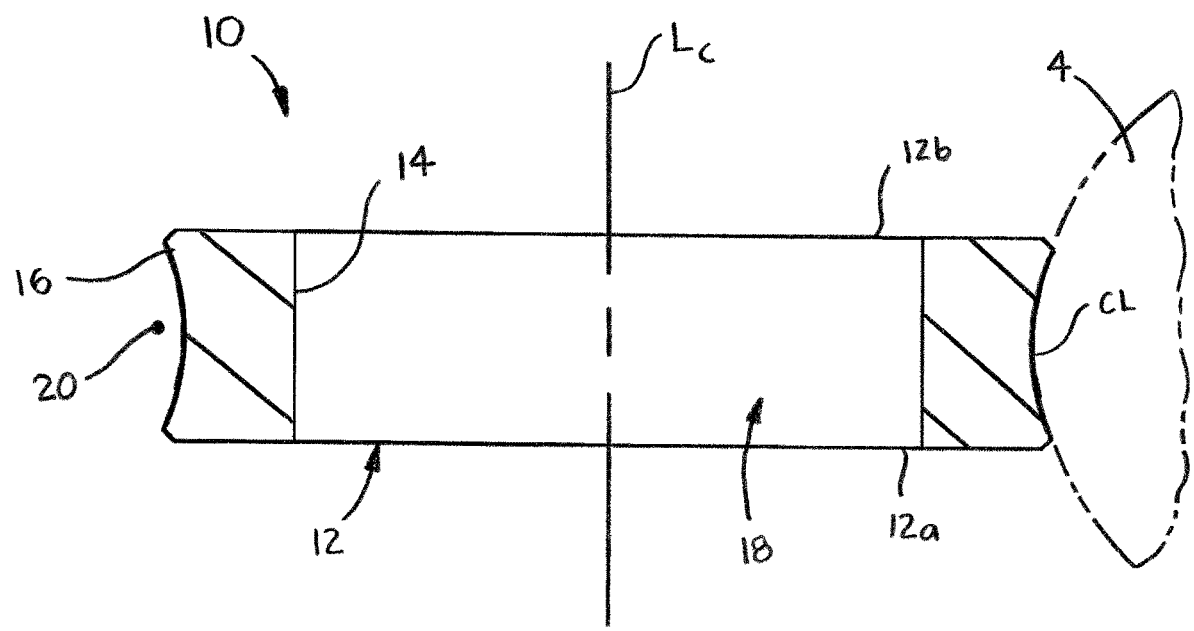
FIG. 7 is a cross-sectional view of a separator formed in accordance with a second construction of the present invention.
Figure 8:
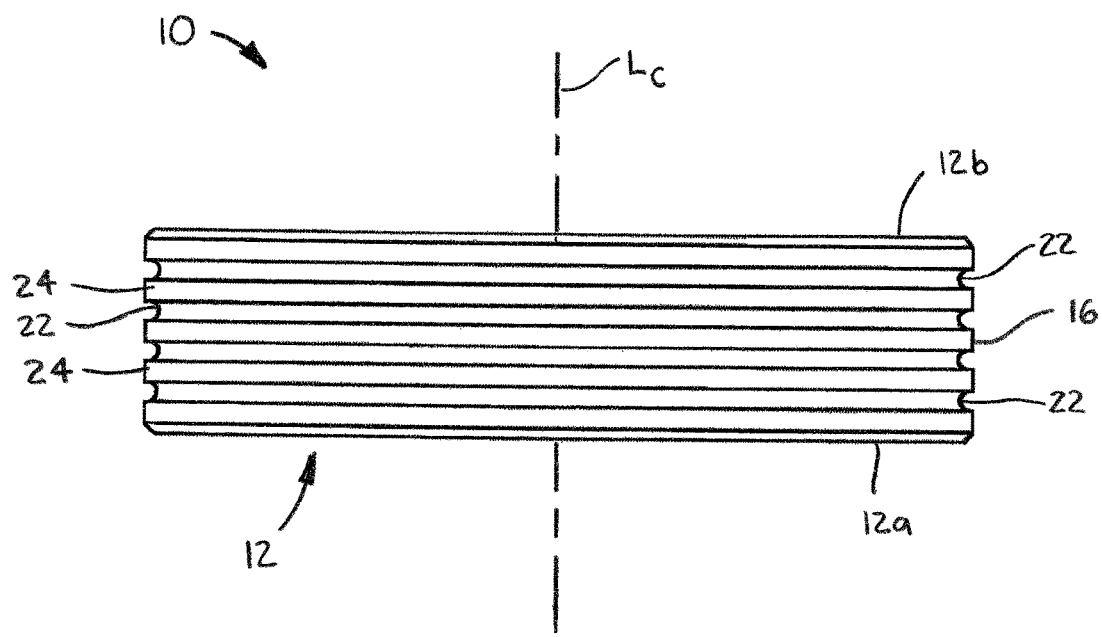
FIG. 8 is a side plan view of a separator formed in accordance with a third construction of the present invention.

Referring to FIG. 7-8, although the present separator 10 preferably includes both a concave outer circumferential surface 16 and a plurality of axially spaced annular grooves 22, the separator 10 may alternatively be formed with a "smooth" concave outer circumferential surface 16 without any grooves, as shown in FIG. 7, or with a cylindrical outer surface 16 having a plurality of axially spaced grooves 22, as depicted in FIG. 8. As further alternatives, the separator 10 may be formed with only a single groove 22, with a plurality of circumferentially spaced arcuate grooves or discrete pockets or with any other appropriate configuration of recesses for containing lubricant (no alternatives shown).

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A separator for a ball bearing, the ball bearing including inner and outer rings and a plurality of balls disposed between the inner and outer rings, the separator comprising:
an annular body having a centerline, opposing first and second axial ends, an inner circumferential surface defining a central pocket sized to receive one of the plurality of balls, and a concave outer circumferential surface defining an annular channel and configured to contact at least one adjacent one of the balls at a plurality of contact sections spaced axially apart between the first and second axial ends or along a curved line extending at least partially between the first and second axial ends, and wherein the annular body further includes at least one annular groove extending radially inwardly from the concave outer circumferential surface and circumferentially about the centerline.

2. The separator as recited in claim 1, wherein the concave outer circumferential surface has a radius of curvature about equal to a radius of curvature of an outer surface of each one of the balls.

3. The separator as recited in claim 1, wherein the at least one annular groove includes a plurality of annular grooves spaced axially apart.

4. The separator as recited in claim 3, further comprising lubricant disposed within at least one of the annular grooves.

5. The separator as recited in claim 3, wherein the annular body includes a plurality of annular ribs spaced axially apart, each groove being defined between a separate pair of adjacent ribs and each rib providing a separate one of the axially spaced contact sections.

6. The separator as recited in claim 1, wherein the inner circumferential surface is cylindrical.

7. The separator as recited in claim 1, wherein the annular body has a radius extending from the centerline to a radially-innermost surface section of the concave outer circumferential surface, the radius establishing a minimum spacing distance between the ball disposed within the central pocket and each one of the adjacent balls.

8. The separator as recited in claim 1, wherein the first axial end of the annular body is configured to be slidably disposed upon an outer circumferential surface of the bearing inner ring and/or the second end axial end of the annular body is configured to be slidably disposed against an inner circumferential surface of the bearing outer ring so as to retain the separator disposed centrally about the ball disposed within the central pocket.

9. The separator as recited in claim 1, wherein the annular body is formed of a molded polymeric material.

10. A separator for a ball bearing, the ball bearing including inner and outer rings and a plurality of balls disposed between the inner and outer rings, the separator comprising:
an annular body having a centerline, opposing first and second axial ends, an inner circumferential surface defining a central pocket sized to receive one of the plurality of balls, an outer circumferential surface and a plurality of axially-spaced annular grooves extending radially inwardly from the outer circumferential surface and circumferentially about the centerline;
wherein the outer circumferential surface is concave, defines an annular channel and is configured to contact at least one adjacent one of the balls along a plurality of contact sections spaced axially apart.

11. The separator as recited in claim 10, wherein the concave outer circumferential surface has a radius of curvature about equal to a radius of curvature of an outer surface of each one of the balls.

12. The separator as recited in claim 10, wherein the annular body has a radius extending from the centerline to a radially-innermost surface section of the concave outer circumferential surface, the radius establishing a minimum spacing distance between the ball disposed within the central pocket and each one of the adjacent balls.

13. The separator as recited in claim 10, further comprising lubricant disposed within at least one of the annular grooves.

14. The separator as recited in claim 10, wherein the annular body includes a plurality of annular ribs spaced axially apart, each groove being defined between a separate pair of adjacent ribs and each rib providing a separate one of the axially spaced contact sections.

15. The separator as recited in claim 10, wherein the inner circumferential surface is cylindrical.

16. The separator as recited in claim 10, wherein the first axial end of the annular body is configured to be slidably disposed upon an outer circumferential surface of the bearing inner ring and/or the second end axial end of the annular body is configured to be slidably disposed against an inner circumferential surface of the bearing outer ring so as to retain the separator disposed centrally about the ball disposed within the central pocket.

17. The separator as recited in claim 10, wherein the annular body is formed of a molded polymeric material.

* * * * *